United States Patent
Park et al.

(10) Patent No.: US 11,111,565 B2
(45) Date of Patent: Sep. 7, 2021

(54) ENTROPY-CONTROLLED BCC ALLOY HAVING STRONG RESISTANCE TO HIGH-TEMPERATURE NEUTRON RADIATION DAMAGE

(71) Applicants: SEOUL NATIONAL UNIVERSITY R&DB FOUNDATION, Seoul (KR); KOREA INSTITUTE OF SCIENCE AND TECHNOLOGY, Seoul (KR)

(72) Inventors: Eun Soo Park, Suwon-si (KR); Hyun Seok Oh, Seoul (KR); Il Hwan Kim, Seoul (KR); Hye Jung Chang, Seoul (KR); Sangjun Kim, Daegu (KR); Chae Woo Ryu, Suwon-si (KR)

(73) Assignees: SEOUL NATIONAL UNIVERSITY R&DB FOUNDATION, Seoul (KR); KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 700 days.

(21) Appl. No.: 15/146,151

(22) Filed: May 4, 2016

(65) Prior Publication Data
US 2016/0326616 A1    Nov. 10, 2016

(30) Foreign Application Priority Data

May 4, 2015    (KR) .................. 10-2015-0062736

(51) Int. Cl.
*C22C 30/00*    (2006.01)
*C22C 1/04*    (2006.01)
(Continued)

(52) U.S. Cl.
CPC .............. *C22C 30/00* (2013.01); *B22F 3/105* (2013.01); *B22F 3/15* (2013.01); *C22C 1/02* (2013.01);
(Continued)

(58) Field of Classification Search
None
See application file for complete search history.

(56) References Cited

U.S. PATENT DOCUMENTS

| 2,870,076 | A | * | 1/1959 | Koch | ....................... G21C 1/02 376/173 |
| 4,440,736 | A | * | 4/1984 | Maeland | ............... C01B 3/0031 148/421 |
| 2005/0067060 | A1 | * | 3/2005 | Huang | .................. C01B 3/0031 148/421 |

FOREIGN PATENT DOCUMENTS

| JP | 3280020 B2 | 4/2002 |
| KR | 10-1507898 B1 | 4/2015 |

OTHER PUBLICATIONS

Low-density, refractory multi-principal element alloys of the Cr—Nb—Ti—V—Zr system: Microstructure and phase analysis, O.N. Senkov et al. / Acta Materialia 61 (2013) 1545-1557 (Year: 2013).*

(Continued)

*Primary Examiner* — Anthony J Zimmer
*Assistant Examiner* — Michael J Kachmarik
(74) *Attorney, Agent, or Firm* — Sughrue Mion, PLLC

(57) ABSTRACT

Disclosed is an entropy-controlled solid solution matrix BCC alloy having strong resistance to high-temperature neutron radiation damage. The entropy-controlled solid solution matrix BCC alloy includes three or more multi-component main elements selected from the element group consisting of Zr, Al, Nb, Mo, Cr, V, and Ti selected based on a neutron absorption cross-sectional area and a mixing enthalpy. Each of the elements is included in an amount of 5 to 35 at %, and the entropy-controlled solid solution matrix BCC alloy is a BCC-structure solid solution matrix alloy in a medium-entropy to high-entropy state. In this invention, damage caused by neutron radiation is reduced, and entropy is controlled to thus ensure a solid solution matrix BCC (Continued)

structure having a slow diffusion speed, and accordingly, resistance to void swelling due to radioactive rays is high.

6 Claims, 18 Drawing Sheets

(51) Int. Cl.
<table>
<tr><td>G21C 11/08</td><td>(2006.01)</td></tr>
<tr><td>G21C 1/02</td><td>(2006.01)</td></tr>
<tr><td>G21C 3/07</td><td>(2006.01)</td></tr>
<tr><td>C22C 14/00</td><td>(2006.01)</td></tr>
<tr><td>C22C 16/00</td><td>(2006.01)</td></tr>
<tr><td>C22C 27/04</td><td>(2006.01)</td></tr>
<tr><td>C22C 27/02</td><td>(2006.01)</td></tr>
<tr><td>C22C 27/06</td><td>(2006.01)</td></tr>
<tr><td>C22C 21/00</td><td>(2006.01)</td></tr>
<tr><td>C22C 1/02</td><td>(2006.01)</td></tr>
<tr><td>B22F 3/105</td><td>(2006.01)</td></tr>
<tr><td>B22F 3/15</td><td>(2006.01)</td></tr>
</table>

(52) U.S. Cl.
CPC .............. *C22C 1/026* (2013.01); *C22C 1/045* (2013.01); *C22C 1/0416* (2013.01); *C22C 1/0458* (2013.01); *C22C 14/00* (2013.01); *C22C 16/00* (2013.01); *C22C 21/00* (2013.01); *C22C 27/02* (2013.01); *C22C 27/025* (2013.01); *C22C 27/04* (2013.01); *C22C 27/06* (2013.01); *G21C 1/02* (2013.01); *G21C 3/07* (2013.01); *G21C 11/083* (2013.01); *B22F 2003/1051* (2013.01); *Y02E 30/30* (2013.01)

(56) References Cited

OTHER PUBLICATIONS

Microstructural development in equiatomic multicomponent alloys, B. Cantor et al. Materials Science and Engineering A 375-377 (2004) 213-218 (Year: 2004).*

Aluminium—Niobium—Titanium, Ludmila Tretyachenko, Landolt-Bornstein Substance / Property Index IV/11A4: Ternary Alloy Systems. Crystallographic and Thermodynamic Data, Phase Diagrams (Year: 2006).*

Aluminium—Titanium—Zirconium, Ludmila Tretyachenko, Landolt-Bornstein Substance / Property Index IV/11A4: Ternary Alloy Systems. Crystallographic and Thermodynamic Data, , Phase Diagrams (Year: 2006).*

Landolt-Bornstein Substance / Property Index IV/11A4: Ternary Alloy Systems. Crystallographic and Thermodynamic Data, Phase Diagrams, 2006 (Year: 2006).*

C. Woodward, Effect of aluminum on the microstructure and properties of two refractory high-entropy alloys, Feb. 23, 2014, Acta Materialia ScienceDirect, (Year: 2014).*

Mariana Braic, Solid solution or amorphous phase formation in TiZr-based ternary to quinternary multi-principal-element films, Progress in Natural Science Materials International, Jul. 24, 2014, (Year: 2014).*

Yong Zhang, Microstructural control and properties optimization of high entrop alloys, Procedia Engineering, (Year: 2011).*

Peter Liaw, Radiation Behavior of High-Entropy Alloys for Advanced Reactors, US Department of Energy, (Year: 2014).*

O.N. Senkov, Low-densitym refractory multi-principal element alloys of the Cr—Nb—Ti—V—Zr system: Microstructure and phase analysis, Acta Materialia Dec. 19, 2012, (Year: 2012).*

Stepanov, Structure and mechanical properties of a light-weight AlNbTiV high entropy alloy, Materials Letters, published Dec. 9, 2014 (Year: 2014).*

D. Johnson, Temperature-dependent chemical ordering in bcc-based ternary alloys: a theoretical study of Ti—Al—Nb, Philosophical Magazine Letters, 1999, vol. 79, No. 8, 551±559. (Year: 1999).*

Singh, Concentration Waves in High-Entropy Alloys—a new alloy design approach, presented Mar. 4, 2015 (Year: 2015).*

Shun, Microstructure and mechanical properties of multiprincipalcomponent CoCrFeNiMoxalloys, Materials characterization 70, published 2012, (Year: 2012).*

J.W. Yeh, High-Entropy Alloys, published 2014 chapters 1 and 6, (Year: 2014).*

Y. Zhang et al., Alloy Design and Properties Optimization of High-Entropy Alloys, JOM, vol. 64, No. 7, 2012; p. 830-838.

* cited by examiner

Fig. 1

| 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|----|----|----|----|----|----|----|----|----|
| H |   |   |   |   |   |   |   |   |    |    |    |    |    |    |    |    | He |
| Li | Be |   |   | ■ HCP |   |   |   |   |    |    |    | B | C | N | O | Fe | Ne |
| Na | Mg |   |   | ☐ FCC |   |   |   |   |    |    |    | Al | Si | P | S | Cl | Ar |
| K | Ca | Sc | Ti | V | Cr | Mn | Fe | Co | Ni | Cu | Zn | Ga | Ge | As | Se | Br | Kr |
| Rb | Sr | Y | Zr | Nb | Mo | Tc | Ru | Rh | Pd | Ag | Cd | In | Sn | Sb | Te | I | Xe |
| Cs | Ba | * | Hf | Ta | W | Re | Os | Ir | Pt | Au | Hg | Tl | Pb | Bi | Po | At | Rn |
| Fr | Ra | ** | Rf | Db | Sg | Bh | Hs | Mt | Ds | Rg | Cn | Uut | Fl | Uup | Lv | Uus | Uuo |

| sym | oa/barns | # | sym | oa/barns | # | sym | oa/barns | # |
|---|---|---|---|---|---|---|---|---|
| O | 0.00019 | 8 | Fe | 2.56 | 26 | Co | 37.2 | 27 |
| C | 0.0035 | 6 | Mo | 2.6 | 42 | Nd | 49 | 60 |
| He | 0.007 | 2 | Ga | 2.9 | 31 | Ag | 63.6 | 47 |
| Be | 0.0092 | 4 | Cr | 3.1 | 24 | Ho | 65 | 67 |
| F | 0.0096 | 9 | Tl | 3.43 | 81 | Li | 70.5 | 3 |
| Po | 0.03 | 84 | Cu | 3.78 | 29 | Am | 75.3 | 95 |
| Bi | 0.034 | 83 | As | 4.3 | 33 | Cm | 79 | 96 |
| Ne | 0.04 | 10 | Ni | 4.49 | 28 | Lu | 84 | 71 |
| Mg | 0.063 | 12 | Te | 4.7 | 58 | Re | 89.7 | 75 |
| Pb | 0.171 | 82 | Sb | 4.91 | 51 | Au | 98.7 | 79 |
| Si | 0.171 | 14 | V | 5.08 | 23 | Tm | 100 | 69 |
| P | 0.172 | 15 | Ti | 6.09 | 22 | Hf | 104 | 72 |
| Zr | 0.184 | 40 | I | 6.2 | 53 | Rh | 144.8 | 45 |
| Al | 0.232 | 13 | Br | 6.8 | 35 | Es | 160 | 99 |
| H | 0.3326 | 1 | Pd | 6.9 | 46 | Er | 160 | 68 |
| Rb | 0.38 | 37 | Th | 7.37 | 90 | Pm | 168.4 | 61 |
| Ca | 0.43 | 20 | U | 7.57 | 92 | Np | 180 | 93 |
| S | 0.53 | 16 | La | 8.98 | 57 | In | 194 | 49 |
| Na | 0.53 | 11 | Pr | 11.5 | 59 | Pa | 200.6 | 91 |
| Ce | 0.6 | 58 | Se | 11.7 | 34 | Hg | 374 | 80 |
| Sn | 0.626 | 50 | Ra | 12.8 | 88 | Ir | 425 | 77 |
| Ar | 0.675 | 18 | Mn | 13.3 | 25 | Ac | 515 | 89 |
| Rn | 0.72 | 86 | Os | 15 | 76 | Bk | 710 | 97 |
| Pt | 0.96 | 78 | W | 18.3 | 74 | B | 767 | 5 |
| Zn | 1.11 | 30 | Tc | 20 | 43 | Dy | 920 | 66 |
| Nb | 1.15 | 41 | Ta | 20.6 | 73 | Pu | 1017.3 | 94 |
| Y | 1.28 | 39 | Tb | 23.4 | 65 | Cd | 2450 | 48 |
| Sr | 1.28 | 38 | Xe | 23.9 | 54 | Cf | 2900 | 98 |
| Ba | 1.3 | 56 | Kr | 25 | 36 | Eu | 4600 | 63 |
| N | 1.91 | 7 | Sc | 27.2 | 21 | Fm | 5800 | 100 |
| K | 2.1 | 19 | Cs | 29 | 55 | Sm | 5922 | 62 |
| Ge | 2.2 | 32 | Yb | 34.8 | 70 | Gd | 49000 | 64 |
| Ru | 2.56 | 44 | Cl | 35.5 | 17 | | | |

Fig. 2

|     | Al  | Ti  | V   | Cr  | Fe  | Cu  | Zr  | Nb  | Mo  |
| --- | --- | --- | --- | --- | --- | --- | --- | --- | --- |
| Al  | 0   | -30 | -16 | -10 | -11 | -1  | -44 | -18 | -5  |
| Ti  | sym | 0   | -2  | -7  | -17 | -9  | 0   | 2   | -4  |
| V   | sym | sym | 0   | -2  | -7  | 5   | -4  | -1  | 0   |
| Cr  | sym | sym | sym | 0   | -1  | 12  | -12 | -4  | 5   |
| Fe  | sym | sym | sym | sym | 0   | 13  | -25 | -16 | -2  |
| Cu  | sym | sym | sym | sym | sym | 0   | -23 | 3   | 19  |
| Zr  | sym | sym | sym | sym | sym | sym | 0   | 4   | -6  |
| Nb  | sym | sym | sym | sym | sym | sym | sym | 0   | -6  |
| Mo  | sym | sym | sym | sym | sym | sym | sym | sym | 0   |

Fig. 3

ENTROPY-CONTROLLED BCC ALLOY HAVING STRONG RESISTANCE TO HIGH-TEMPERATURE NEUTRON RADIATION DAMAGE

BACKGROUND OF THE INVENTION

1. Field of the Invention

The present invention relates to an alloy material used in a high-temperature neutron radiation environment. More particularly, the present invention relates to an alloy which includes a BCC (body-centered cubic)-structure solid solution matrix that includes an entropy-controlled alloy design of elements having a small neutron absorption cross-sectional area even though the alloy is a multicomponent-based alloy that includes a plurality of main elements, thus being usable as a structural material for fourth-generation nuclear power systems, which are currently being developed.

2. Description of the Related Art

Generally, nuclear reactors are operated in high-temperature environments, and moreover, are operated in extreme environments in which large amounts of radioactive radiation are generated. Accordingly, a material that is strongly resistant to high temperatures and to damage caused by neutron radiation needs to be used to manufacture nuclear power systems. Particularly, various lattice defects are formed in such material due to neutron radiation, and helium is generated as the result of nuclear transformation, entailing damage. Accordingly, various types of neutron radiation damage occur, and must be essentially considered. Therefore, a structural material for use in nuclear power systems must have excellent strength and ductility at high temperatures in order to ensure strong resistance to radiation embrittlement, excellent mechanical properties, such as creep and fatigue properties, and strong resistance to radiation creep entailing acceleration of creep. Further, the structural material must be strongly resistant to radiation damage, such as void swelling caused by grouping of atom vacancies due to the large amount of radioactive rays or embrittlement owing to generated helium (helium embrittlement), and must be compatible with coolants and fuel.

The aforementioned damage is rarely considered a problem in currently used light-water reactors, except for some parts. However, the aforementioned damage is considered a big problem in the reactor core material of fast-breeder reactors and nuclear-fusion reactors, which are next-generation nuclear reactors. Particularly, a zirconium alloy, which is one of the alloys exhibiting the strongest resistance to radiation damage, has been developed as material for a jacket pipe, which comes into the most direct contact with nuclear fuel. However, for future fourth-generation nuclear reactors, which are currently being developed, the operation temperature range and the neutron exposure environment are 550° C. (SFR; sodium-cooled fast reactor) to 1000° C. (VHTR; very high temperature reactor) and 200 dpa or less, respectively, and exceed the available range of materials, such as 316 stainless steel and zirconium alloys, which are developed in the related art, compared to known light-water reactors (operation temperature range: less than 400° C., neutron exposure environment: 50 dpa or less). Accordingly, there is a need to develop a novel material which is capable of withstanding a complex environment of high-temperature neutron radiation.

Further, examples of material currently used for the heat exchanger of the nuclear power generator include "Alloy 617", "Hastelloy XR", and "Alloy 230". The aforementioned examples are nickel-based superalloy high-temperature materials that include nickel as a main element owing to its strong resistance to high temperatures. The materials have favorable mechanical properties, such as creep behavior at high temperatures, and are also strongly resistant to radiation damage, and attempts to further develop the materials have been continuously made (Korean Patent No. 10-1507898).

Meanwhile, helium, which is used as a coolant in high-temperature furnaces, is known to be inert and be present together with a small amount of impurities. Currently used nickel-based alloys have a drawback in that nickel, which is the main element, reacts with helium to exhibit brittleness. Therefore, there is an increasing demand for a novel alloy material that does not include nickel, has excellent physical properties at high temperatures, and is also strongly resistant to radioactive radiation damage.

[Prior Art Document] Korean Patent No. 10-1507898

SUMMARY OF THE INVENTION

Accordingly, the present invention has been made keeping in mind the above problems occurring in the related art, and an object of the present invention is to provide a BCC alloy for use as a fourth-generation nuclear reactor structural material, which is strongly resistant to high-temperature neutron radiation damage. The BCC alloy includes a BCC (body-centered cubic)-structure solid solution matrix that includes an entropy-controlled alloy design of elements having a small neutron absorption cross-sectional area even though the alloy is a multicomponent-based alloy that includes a plurality of main elements.

In order to accomplish the above object, the present invention provides an entropy-controlled solid solution matrix BCC alloy having strong resistance to high-temperature neutron radiation damage. The entropy-controlled solid solution matrix BCC alloy includes three or more elements selected from the element group consisting of Zr, Al, Nb, Mo, Cr, V, and Ti, selected based on a neutron absorption cross-sectional area and a mixing enthalpy. Each of the elements is included in an amount of 5 to 35 at %, and the entropy-controlled solid solution matrix BCC alloy includes a multicomponent-based alloy including a plurality of main elements to thus ensure relatively high constitutional entropy. Accordingly, the entropy-controlled solid solution matrix BCC alloy has a BCC-structure solid solution matrix even though the alloy is a multicomponent-based alloy.

When the constitutional elements selected from the element group are mixed at an equiatomic ratio, or when five or more elements selected from the element group are included, a high-entropy solid solution matrix BCC alloy is capable of being manufactured. In the high-entropy solid solution matrix BCC alloy, preferably, the diffusion speed is reduced owing to the solid solution in lattices of a plurality of elements to thus impart strong resistance to changes in properties caused by high-temperature precipitation.

Additionally, in the present invention, three or more elements, selected from the element group consisting of elements that have a small neutron absorption cross-sectional area (10 σa/barns or less) and a small mixing enthalpy difference ($\Delta H_{mix}=\pm 15$ kJ/mol or less) to thus be capable of constituting the BCC-structure solid solution matrix alloy, are mixed to control entropy, thereby manufacturing the BCC-structure solid solution matrix alloy having strong resistance to high-temperature neutron radiation damage.

In order to form the BCC-structure solid solution using a multicomponent-based alloy, unlike a typical commercial alloy including a multicomponent-based alloy having a single element as a main component, the multicomponent-based alloy including a plurality of main elements must be formed in a medium-entropy to high-entropy state, and accordingly, each of the selected elements must be included in an amount of 5 to 35 at %. In the present invention, among the aforementioned elements, three or more elements may be included, up to a maximum of seven elements, and accordingly, the range of 5 to 35 at % may be appropriately selected depending on the number of constitutional elements. When the number of constitutional elements is 3, the minimum amount of each component may be determined such that the sum of the element ratios is 100 at %.

The present invention including the aforementioned composition has merits in that the elements have a small neutron absorption cross-sectional area to thus reduce neutron radiation damage and in that entropy is controlled to thus ensure a solid solution matrix BCC structure having a slow diffusion speed, thereby increasing resistance to void swelling caused by radioactive rays.

Further, in the present invention, the alloy is provided in the medium-entropy to high-entropy state to thus stably maintain the solid-solution BCC phase even at high temperatures. Further, the solid solution matrix is present in a unique state including the multicomponent elements as main elements to thus exhibit a solid-solution hardening effect. Accordingly, both high-temperature hardness and the characteristic ductility of the solid solution matrix may be increased.

Among metals used in the present invention, Zr, Al, and Nb have a small neutron absorption cross-sectional area of 1.2 σa/barns or less to thus have excellent resistance to neutron radiation damage. Accordingly, when Zr, Al, or Nb is included, neutron damage is reduced. Particularly, since Al has a property of stabilizing the BCC structure, the BCC structure is stabilized to thus increase resistance to void swelling when Al is included. Further, the cocktail effect of the multicomponent solid solution is expected to realize a property of strong resistance to neutron radiation damage, as many elements having strong resistance to neutron radiation damage are included. Cr and Ti are resistant to high-temperature oxidation. Accordingly, when Cr and Ti are included, the lifespan of the material in a high-temperature corrosive environment is increased. Mo and V control mechanical properties, for example, improve the rigidity of the solid solution at high temperatures or the ductility of the solid solution. Particularly, V serves to maintain the ductility of the material using Laves-phase precipitation controlling between Ti and Cr, which increase oxidation resistance.

A preferable embodiment of the present invention having the aforementioned elemental properties may include an alloy based on three or more components, which essentially includes one to three elements selected from Zr, Al, and Nb, having a relatively small neutron absorption cross-sectional area, and also includes one or more elements selected from the elements Cr and Ti, which help to improve the lifespan of the material in the high-temperature corrosive environment or Mo and V, which are elements controlling the mechanical properties of the solid solution at high temperatures. It is further preferable that one or more elements be selected from the Cr and Ti elements, which help to improve the lifespan of the material in the high-temperature corrosive environment, and that one or more elements be selected from Mo and V, which are elements that control the mechanical properties of the solid solution at high temperatures.

Accordingly, the three or more component-based alloy system including the multicomponent elements as the main elements is provided so that the ratio of each of the elements is in the range of 5 to 35 at % to thus control entropy, thereby ensuring a matrix having the state of a medium-entropy solid solution to a high-entropy solid solution. When the selected constitutional elements are mixed at an equiatomic ratio, or when five or more elements selected from the aforementioned element group are included, the high-entropy solid solution matrix BCC alloy is capable of being manufactured. In the high-entropy solid solution matrix BCC alloy, preferably, the diffusion speed may be reduced to thus impart strong resistance to changes in properties caused by high-temperature precipitation.

Additionally, in the alloy of the present invention, the amount of the intermetallic compound formed in the solid solution matrix and the fine structure of the solid solution are controlled depending on the atomic ratio of the constitutional elements. The atomic ratio of the constitutional elements, which include the multicomponent main elements, is changed to control precipitation of the intermetallic compound and the amount of the intermetallic compound that is formed in the solid solution matrix, thereby ultimately controlling the fine structure of the solid solution.

Meanwhile, among the elements having the small neutron absorption cross-sectional area of 10 σa/barns or less, additional elements, such as Be, C, N, O, Si, Sn, P, Fe, Cu, Ni, and Y, or oxides or nitrides thereof, may be added in a small amount of 0.01 to 5 at % to the entropy-controlled BCC solid solution matrix alloy of the present invention to thus entail solid-solution hardening or promote precipitation, thereby improving the properties.

A method of manufacturing the entropy-controlled solid solution matrix BCC alloy having strong resistance to high-temperature neutron radiation damage according to the present invention may include an arc-melting process of melting raw materials using a plasma arc to alloy the raw materials and then cooling the alloyed raw materials. The arc-melting process has merits in that it is easy to form a homogenous solid solution, the generation of contaminant elements, such as oxides and voids, is minimized compared to a sintering process, and the ductility-brittleness transition temperature (DBTT) of the composition is relatively lower in the arc-melting process than in the sintering process, thus increasing the rupture time. Further, the entropy-controlled solid solution matrix BCC alloy may be manufactured using a commercial casting process, in which raw-material metal is melted, and also using high temperature/high pressure sintering, including spark plasma sintering or hot isostatic pressing of raw materials, which are manufactured in a powder form. The sintering process has a merit in that it is easy to control the fine structure and manufacture parts having a desired shape.

While the raw materials are prepared in order to manufacture the entropy-controlled solid solution matrix BCC alloy having strong resistance to high-temperature neutron radiation damage according to the present invention, a $T_{2nd}/T_s$ value, which is obtained by normalizing a precipitation temperature $T_{2nd}$ of a second phase, competing with the solid solution of the intermetallic compound, using a solidification temperature $T_s$, may be measured using thermal analysis instruments, or may be thermodynamically calculated to thus evaluate whether or not the entropy-controlled single BOO-M phase solid solution matrix alloy is formed using a typical casting process. Accordingly, the entropy-controlled solid solution matrix BCC alloy may be manufactured while checking whether or not the entropy-controlled solid solution matrix BCC alloy is formed. Whether the single BCC-phase alloy is formed may be evaluated based on a $T_{2nd}/T_s$ value of 0.65 or less, which is an evaluation standard for determining the performance of the entropy-controlled solid solution matrix BCC alloy.

Moreover, the fast breeder reactor of the present invention includes the entropy-controlled solid solution matrix BCC alloy having strong resistance to neutron radiation damage, according to the present invention, as the material for a portion on which neutrons are radiated at high temperatures. Particularly, the entropy-controlled solid solution matrix BCC alloy is appropriately applied to reactor core parts. Specifically, the entropy-controlled solid solution matrix BCC alloy of the present invention may be used in all parts, such as a nuclear fuel jacket pipe, a pressure vessel of a nuclear reactor, and a blanket, or in a portion of the parts on which high-temperature neutrons are radiated.

According to the present invention having the aforementioned constitution, elements having a small neutron absorption cross-sectional area are included to thus reduce damage caused by neutron radiation, and a BCC structure is included to thus ensure high resistance to void swelling due to radioactive rays.

Further, an entropy-controlled BCC alloy having strong resistance to high-temperature neutron radiation damage according to the present invention includes an alloy in a medium-entropy to high-entropy state. Accordingly, a solid-solution BCC phase is stably maintained even at high temperatures due to the relatively slow diffusion speed, and both high temperature hardness and ductility may be increased due to the solid-solution hardening effect of the solid solution state, entailing heavy lattice deformation.

Based on the aforementioned characteristics, the entropy-controlled BCC alloy having strong resistance to high-temperature neutron damage according to the present invention is capable of withstanding the relatively high operation temperature range of future fourth-generation fast-breeder reactors, which are currently being developed, and the complex and extreme environment of neutron exposure, thus being usable as a material that is essentially required to develop a future next-generation nuclear reactor having high energy efficiency.

BRIEF DESCRIPTION OF THE DRAWINGS

The above and other objects, features and advantages of the present invention will be more clearly understood from the following detailed description taken in conjunction with the accompanying drawings, in which:

FIG. 1 is a view showing selected alloy element candidates, which are considered to be easy to impart with a BCC solid solution structure, on the periodic table;

FIG. 2 is a view showing selected alloy element candidates, which have a small neutron absorption cross-sectional area and are considered to be easy to impart with a BCC solid solution structure, among various elements;

FIG. 3 is a table showing mixing enthalpies of the selected elements of FIG. 2;

DESCRIPTION OF THE PREFERRED EMBODIMENTS

Figure 4A:
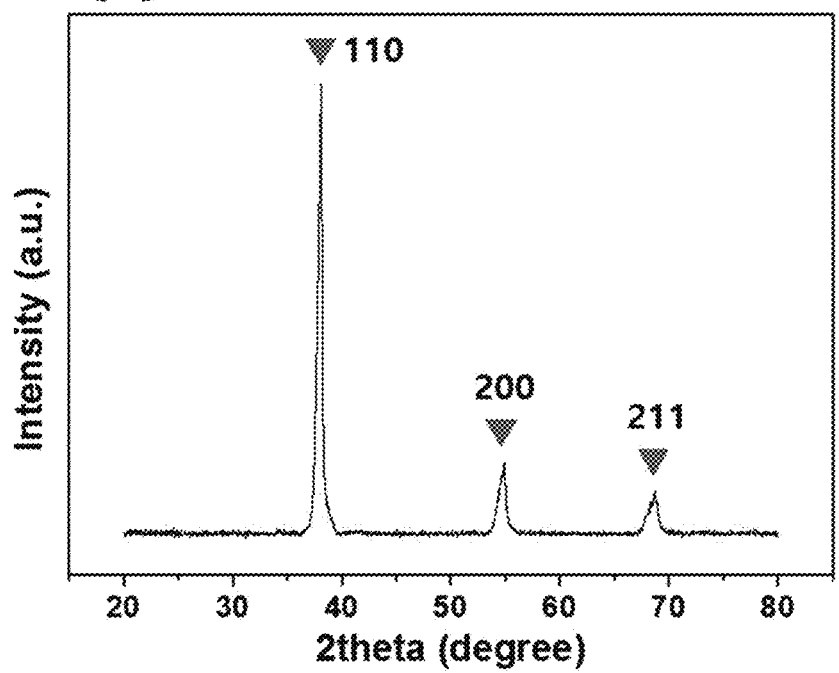
FIGS. 4A and 4B show the results of XRD analysis of (a) ZrTiMo and (b) $ZrNbTi_{0.5}$, which are a ternary medium-entropy alloy, according to an Example of the present invention.

Hereinafter, a detailed description will be given of embodiments of the present invention, with reference to the appended drawings.

A novel entropy-controlled BCC alloy having strong resistance to high-temperature neutron damage according to the present invention has a BCC (body-centered cubic) solid solution matrix structure using an entropy-controlled alloy design of elements having a small neutron absorption cross-sectional area even though the alloy is a multicomponent-based alloy including a plurality of main elements, thereby having a property of strong resistance to radiation damage even in a high-temperature radioactive radiation environment. Accordingly, in order to use the entropy-controlled BCC alloy as a structural material for fourth-generation nuclear power systems, which are currently being developed, the following design procedure is performed.

First, Group IV, V, and VI transition elements having a body-centered cubic (BCC) structure are selected as alloy element candidates in order to reduce void swelling, which is a kind of radiation damage and forms voids in metal at high temperatures when radioactive rays are radiated, thus causing the surface of the metal to swell.

FIG. 1 is a view showing alloyed element candidates, which are selected based on a BCC structure formed during alloying, on the periodic table. As can be seen from the periodic table, the Group V and VI transition elements have a stable BCC phase, and the Group IV transition element has a stable BCC phase at high temperatures. Accordingly, it is easy to form the BCC structure when the Group IV, V, and VI transition elements are cast. Further, when a Period IV transition element is added to the Group IV, V, and VI transition elements, which are easy to impart with the BCC structure, it is easy to ensure the BCC structure having high solid solubility. Al is a BCC-stabilized element and is easy to impart with the BCC structure during alloying. The element group satisfying the aforementioned conditions is represented by the thick line in FIG. 1.

Next, the elements having the small neutron absorption cross-sectional area are selected as the alloy element candidates so as to prevent neutron damage caused by radiation. Generally, the size of the cross-sectional area is used to represent the probability of a reaction occurring between incident particles and an atomic nucleus in a nuclear reaction. Neutrons do not have electric charges and are thus easily brought close to other atomic nuclei, to thus cause various types of interactions. Among the interactions, a cross-sectional area to an absorption reaction of neutrons into a target atomic nucleus is referred to as a neutron absorption cross-sectional area, and is used as a standard in determining reactivity with neutron particles. The neutron absorption cross-sectional area is represented by the number of absorbed neutrons per unit time and unit area, and "barn(b)" is used as the unit of the cross-sectional area. 1 b is $10^{-24}$ cm$^2$. Generally, the reactivity of the material to the neutron particles is reduced to thus increase resistance to neutron radiation damage as the neutron absorption cross-sectional area of the material is reduced, and accordingly, a material having the small neutron absorption cross-sectional area is suitable as a nuclear material. In the present invention, added elements are designed to be selected from element groups having the small value of 10 or less σa/barns, thereby minimizing the neutron absorption cross-sectional area of the developed material.

FIG. 2 is a view showing the neutron absorption cross-sectional areas of various elements and the result of selection of candidate groups based on the neutron absorption cross-sectional areas. The element group satisfying the aforementioned condition is represented by the thick line in FIG. 2, and is compared to the alloy group that is easy to impart with the BCC structure, in FIG. 1, and common elements are represented by the thick circle.

Subsequently, in order to provide the alloy in a high-entropy or medium-entropy state to thus ensure the stable BCC structure at high temperatures and improve mechanical properties at high temperatures using entropy controlling, the elements are selected so as to have a mixing enthalpy (ΔH) of ±15 kJ/mol or less. However, Al, which is the BCC-stabilized element, may have a stable BCC structure even when the mixing enthalpy is high, thus being considered as the constitutional element.

FIG. 3 is a table showing the mixing enthalpies of the elements, considered based on the aforementioned considerations. Based on the aforementioned considerations, Zr, Al, Nb, Mo, Cr, V, and Ti are ultimately selected as the element group used to form the entropy-controlled BCC alloy having strong resistance to high-temperature neutron radiation damage according to the present invention, and three or more elements are mixed so that the amount of each of the elements is in the range of 5 to 35 at % to thus manufacture the entropy-controlled BCC-structure solid solution matrix alloy.

For a high-entropy alloy (HEA), generally, five or more alloy elements are mixed in an amount of 5 to 35 at % (entropy increases as the amount approaches the equiatomic ratio) to entail high constitutional entropy, thereby forming a unique solid solution rather than an intermetallic compound, which is typically precipitated in a multicomponent-based alloy including a single element as a main component. Further, when the number of alloy elements is 3 to 4, the alloy is in a medium-entropy state and has properties that are similar to those of the high-entropy alloy, depending on the constitutional elements. Since the elements, which are selected in the present invention, have a small mixing enthalpy and a small difference in atomic radius, even the alloys in the medium-entropy state have a stable BCC structure in the solid solution state.

Meanwhile, among the elements having the small neutron absorption cross-sectional area of 10 σa/barns or less, additional elements, such as Be, C, N, O, Si, Sn, P, Fe, Cu, Ni, and Y, or oxides or nitrides thereof, may be added in a small amount of 0.01 to 5 at % to the entropy-controlled BCC solid solution matrix alloy of the present invention to thus entail solid solution hardening or promote precipitation, thereby improving the properties. Particularly, it can be confirmed that the strength of the BCC solid solution is significantly improved when related oxides or nitrides are included in the solid solution matrix.

The alloys of Examples are manufactured, depending on the composition of the present invention, in order to conduct a review, described below, of the properties of the entropy-controlled BCC-structure solid solution matrix alloy having strong resistance to high-temperature neutron radiation damage according to the present invention. The alloys of Comparative Examples, other than the composition of the present invention, are manufactured to compare the present invention and the Comparative Examples to thus confirm the effect of the present invention.

Table 1 shows the representative compositions (Examples) of the present invention and the Comparative Examples in order to confirm whether the entropy-controlled BCC-structure solid solution matrix alloy having strong resistance to high-temperature neutron radiation damage according to the present invention was formed. In the Table, BCC means the body-centered cubic structure, IC means the intermetallic compound, BCC+IC means the state in which the IC is partially precipitated in the BCC solid solution matrix structure, and IC (+ BCC) means a complex structure including the IC, precipitated as the main phase, and the BCC.

TABLE 1

| Sample | Composition | Crystal structure |
| --- | --- | --- |
| Comparative Example 1 | NbCrTiVCu | IC (+BCC) |
| Comparative Example 2 | ZrNbCrTiCu | IC (+BCC) |
| Comparative Example 3 | ZrNbTiFe | IC, Unknown phases |
| Comparative Example 4 | ZrAlNbTiFe | IC, Unknown phases |
| Example 1 | ZrTiMo | BCC |
| Example 2 | ZrNbTi$_{0.5}$ | BCC |
| Example 3 | AlNbTiV | BCC |
| Example 4 | AlNbTiMo | BCC |
| Example 5 | ZrNbMoV | BCC + IC |
| Example 6 | ZrAlNbTi | BCC (B2) |
| Example 7 | Al$_{0.5}$NbTiMoV | BCC |
| Example 8 | ZrNb$_{1.5}$TiMoV | BCC |
| Example 9 | ZrNbTiMo$_{0.5}$V | BCC |
| Example 10 | ZrNbCr$_{0.5}$TiV | BCC + IC |
| Example 11 | Zr$_{1.5}$Nb$_{1.5}$TiMoV | BCC |
| Example 12 | Zr$_{1.5}$NbTiMo$_{0.5}$V | BCC |
| Example 13 | ZrNbTiMo$_{0.33}$V$_{0.66}$ | BCC |
| Example 14 | ZrAl$_{0.5}$NbTiV | BCC |
| Example 15 | ZrAlNbTiV | BCC + IC |
| Example 16 | Zr$_{0.5}$AlNbTiV | BCC |
| Example 17 | ZrAlNbTiMo | BCC (B2) |
| Example 18 | Zr$_{0.5}$AlNbTiMoV | BCC |
| Example 19 | ZrAlNbTiMoV | BCC + IC |
| Example 20 | ZrAl$_{0.5}$NbTiMoV | BCC + IC |
| Example 21 | ZrAl$_{0.5}$NbTiMo$_{0.5}$V | BCC + IC |

An arc-melting process is applied to a method of manufacturing the alloy. Alloy raw materials are melted at high temperatures using Arc plasma and then cooled to manufacture the alloy. The reasons why the arc-melting process is applied in the Examples and the Comparative Examples are that it is easy to form a bulk-type homogeneous solid solution and that the generation of contaminant elements, such as oxides and voids, is minimized, which can be compared to a sintering process. Further, the arc-melting process has a merit in that the ductility-brittleness transition temperature (DBTT) of the composition is relatively lower in the arc-melting process than in the sintering process, thus increasing the rupture time. However, the method of manufacturing the alloy according to the present invention is not limited to the arc-melting process, but the alloy may be manufactured using a commercial casting process, in which raw material metal having a high melting point is melted, and also using high temperature/high pressure sintering, including spark plasma sintering or hot isostatic pressing of raw materials, which are manufactured in a powder form. The sintering process has a merit in that it is easy to control the fine structure and manufacture parts having a desired shape.

Figure 4B:
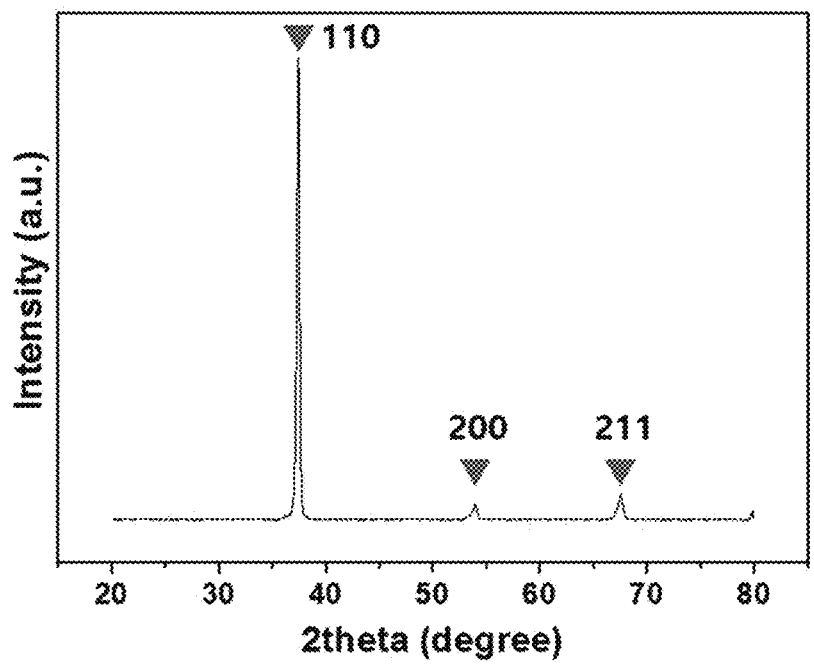
Figure 5A:
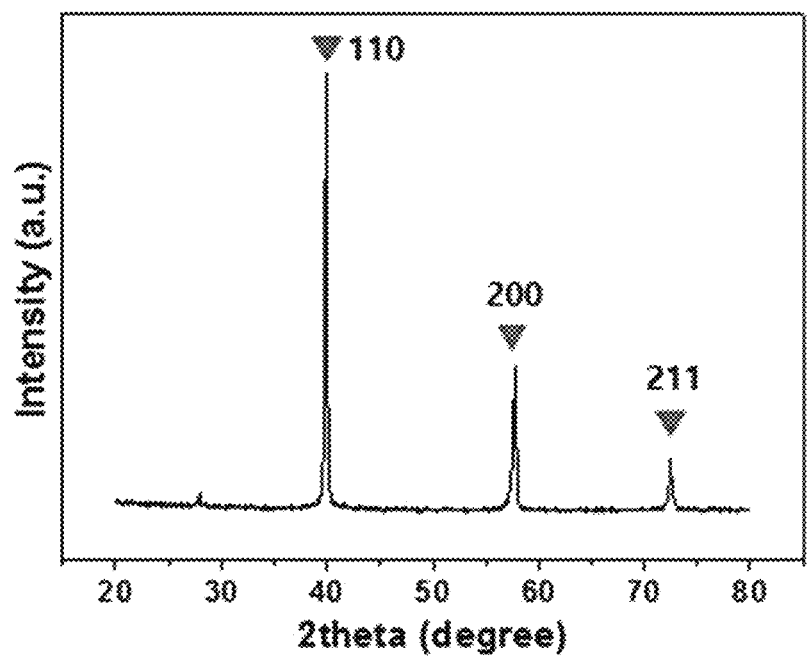
FIGS. 5A to 5D show the results of XRD analysis of (a) AlNbTiV, (b) AlNbTiMo, (c) ZrNbMoV, and (d) ZrAlNbTi, which are a quaternary medium-entropy alloy, according to an Example of the present invention.
Figure 5B:
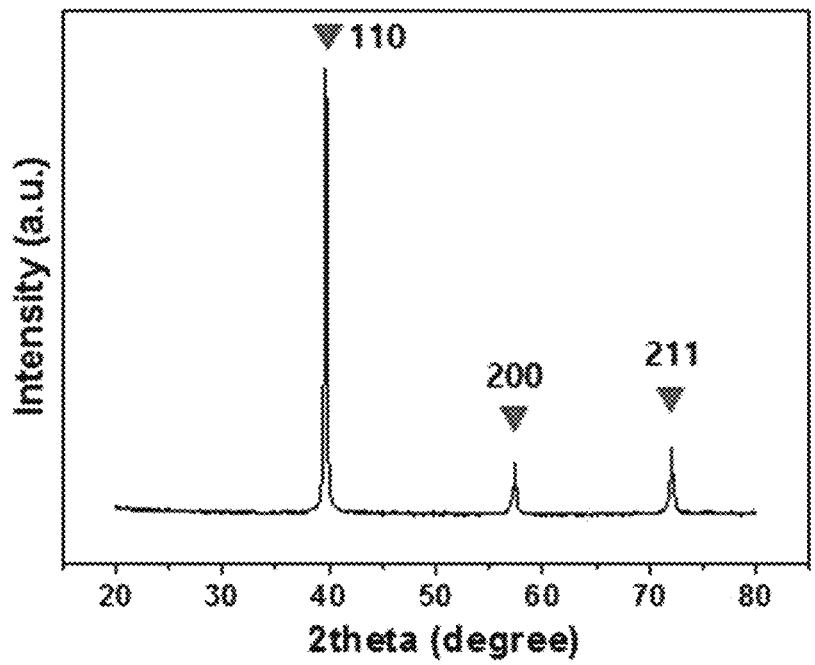
Figure 5C:
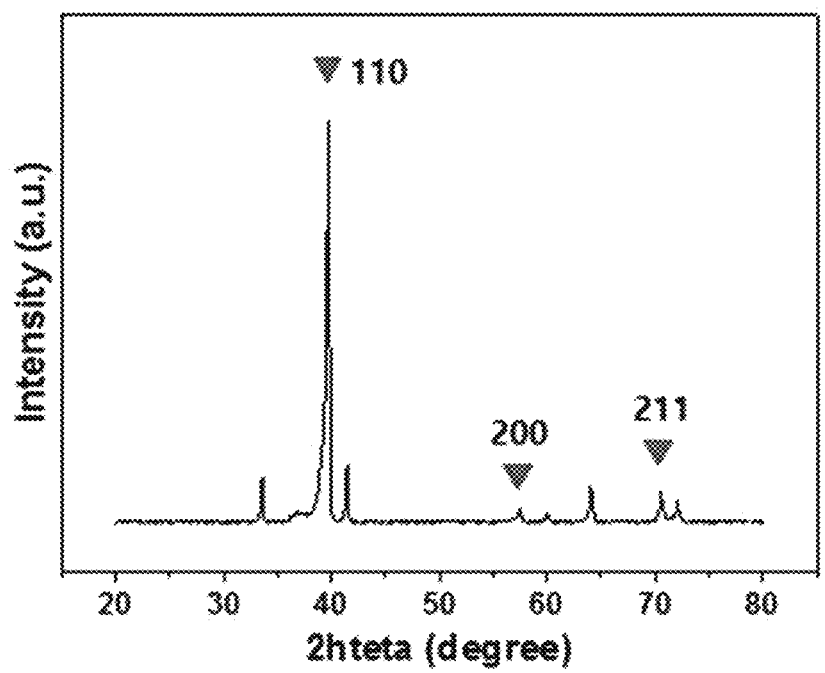
Figure 5D:
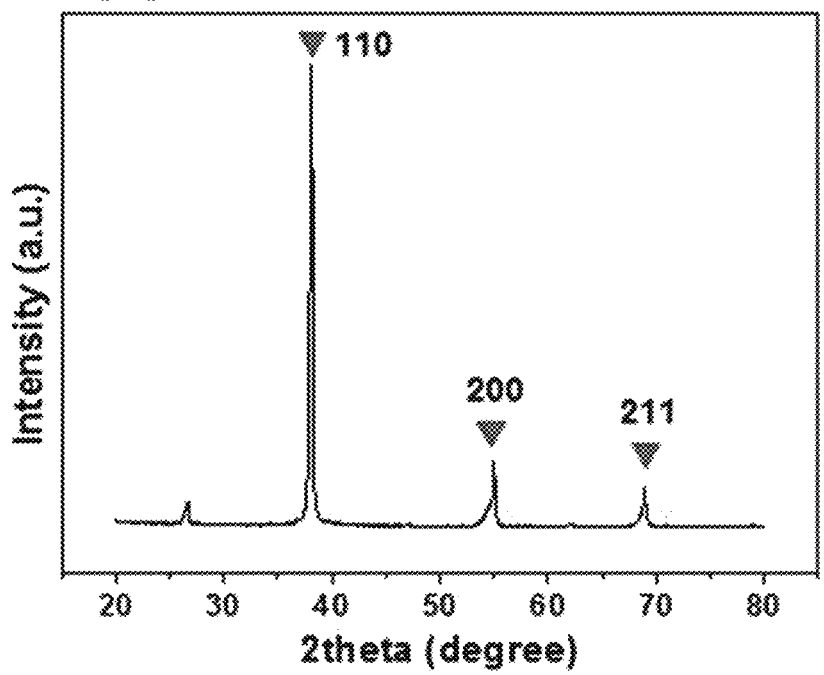
Figure 6A:
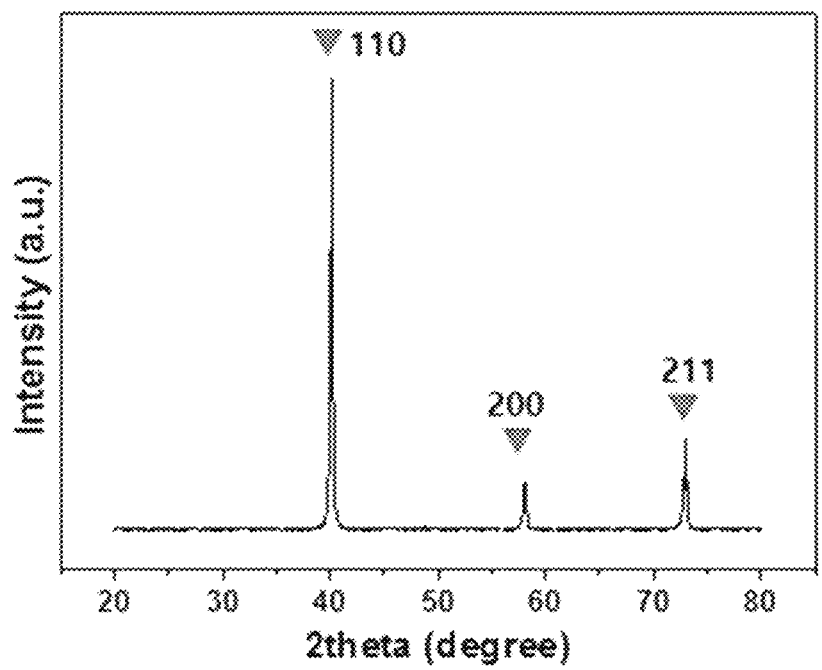
FIGS. 6A to 6D show the results of XRD analysis of (a) $Al_{0.5}NbTiMoV$, (b) $ZrNb_{1.5}TiMoV$, (c) $ZrNbTiMo_{0.5}V$, and (d) $ZrNbCr_{0.5}TiV$, which are a quinary high-entropy alloy, according to an Example of the present invention.
Figure 6B:
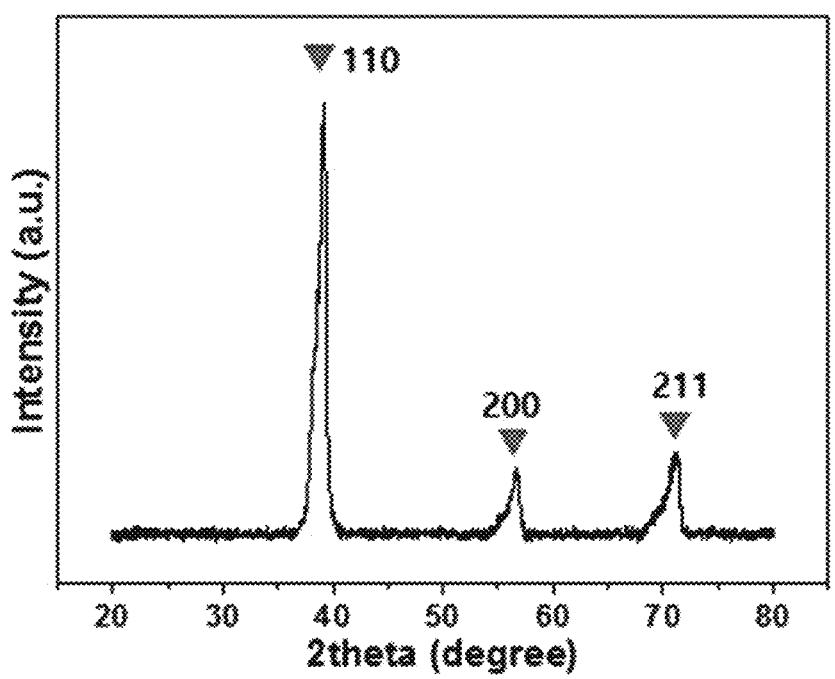
Figure 6C:
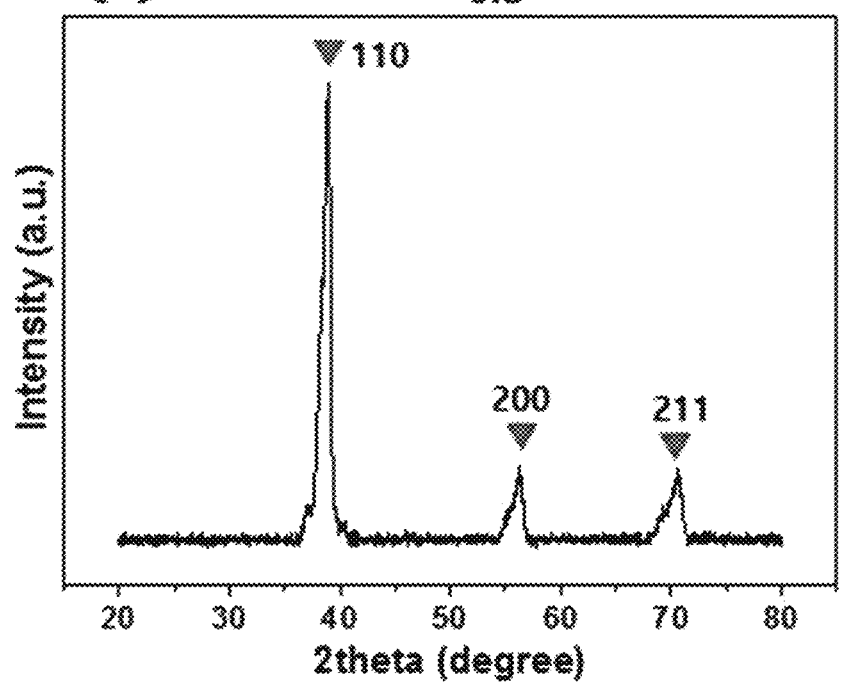
Figure 6D:
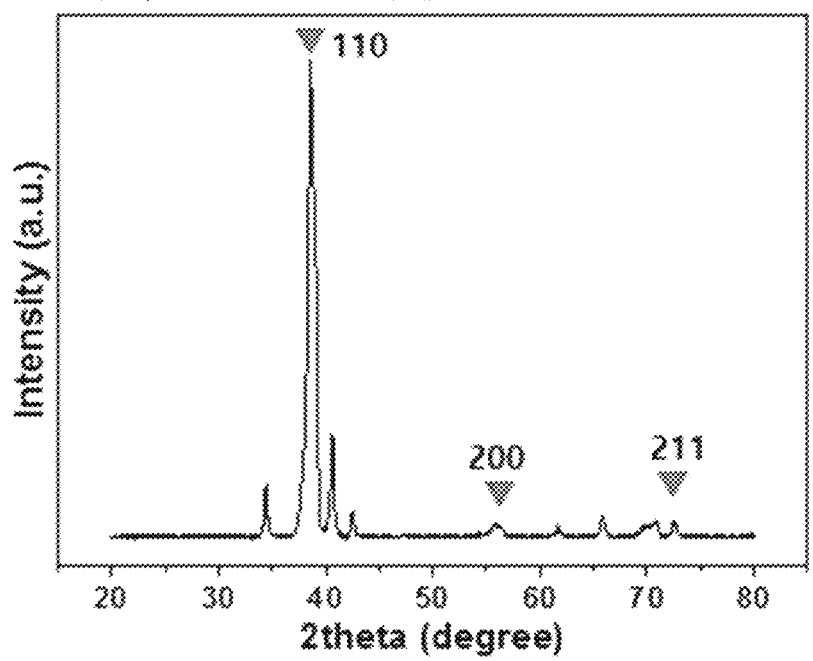

FIGS. 4A and 4B show the results of XRD analysis of ternary medium-entropy alloys according to an Example of the present invention. It can be confirmed that both alloy compositions of (a) ZrTiMo and (b) $ZrNbTi_{0.5}$ according to the present invention have a favorable BCC structure. Particularly, from FIGS. 4A and 4B, it can be confirmed that when the composition is controlled so as to approach the equiatomic ratio, constitutional entropy is increased in the system using even the ternary alloy to thus manufacture the alloy having the BCC structure in the solid-solution state, which is similar to that of the high-entropy alloy. This constitution is also applied to the multicomponent alloy system having three or more components according to the present invention.

FIGS. 5A to 5D show the results of XRD analysis of quaternary medium-entropy alloys according to an Example of the present invention. It can be confirmed that the single BCC phase is precipitated in the case of (a) AlNbTiV, (b) AlNbTiMo, and (d) ZrAlNbTi according to the present invention. It can be confirmed that some intermetallic compounds are precipitated in addition to the BCC phase in the case of the (c) ZrNbMoV composition, but the BCC-structure solid solution matrix is ensured. Accordingly, it can be confirmed that a favorable BCC solid solution matrix structure, which is similar to the high-entropy alloy, is obtained using even the quaternary alloy.

FIGS. 6A to 6D show the results of XRD analysis of (a) $Al_{0.5}NbTiMoV$, (b) $ZrNb_{1.5}TiMoV$, (c) $ZrNbTiMo_{0.5}V$, and (d) $ZrNbCr_{0.5}TiV$, which are quinary high-entropy alloys, according to an Example of the present invention, and include the case where any one element has an atomic ratio that is different from those of other constitutional elements. Additionally, in the alloys of FIGS. 6A to 6D, two elements are selected from among Zr, Al, and Nb, having small neutron absorption cross-sectional areas, one or more elements are selected from Cr and Ti, which help to improve the lifespan of the material in the high-temperature corrosive environment, and one or more elements are selected from Mo and V, which are the elements controlling the mechanical properties of the solid solution at high temperatures. Further, any one element of the constitutional elements has an atomic ratio that is different from those of the other elements. From FIGS. 6A to 6D, it is confirmed that a favorable solid solution matrix BCC alloy was manufactured in all cases. As for (d), the alloy to which both Ti and Cr were added, since Ti and Cr easily form the intermetallic compound, some intermetallic compounds are generated, but the matrix mostly has the BCC-structure in the high-entropy state. Accordingly, it can be confirmed that a high-entropy solid solution matrix BCC alloy is manufactured even when the atomic ratio of the constitutional elements is changed within the range of the present invention.

Figure 7A:
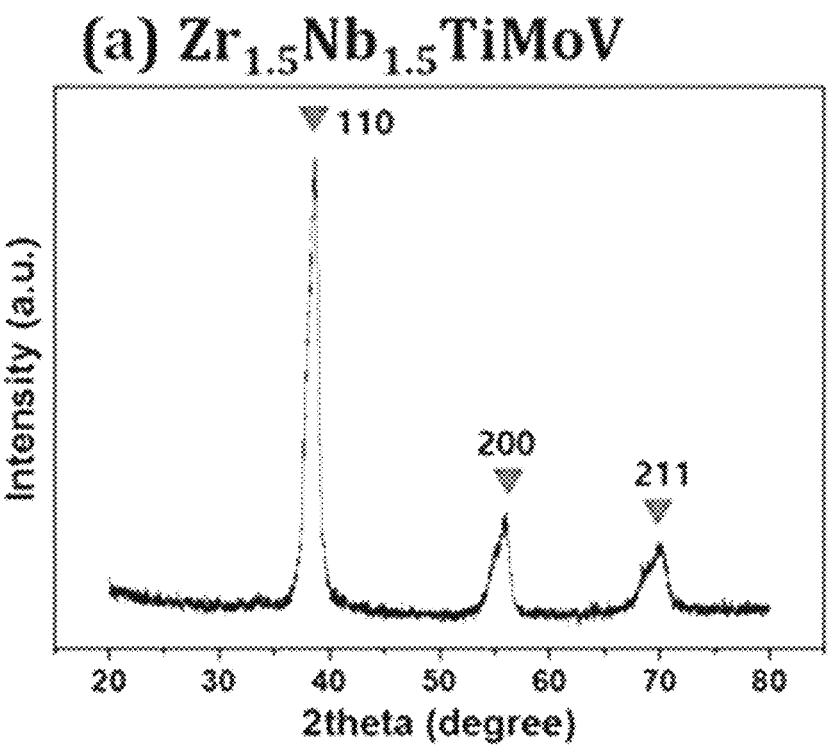
FIGS. 7A to 7C show the results of XRD analysis of (a) $Zr_{1.5}Nb_{1.5}TiMoV$, (b) $Zr_{1.5}NbTiMo_{0.5}V$, and (c) $ZrNbTiMo_{0.33}V_{0.66}$, which are the quinary high-entropy alloy, according to an Example of the present invention.
Figure 7B:
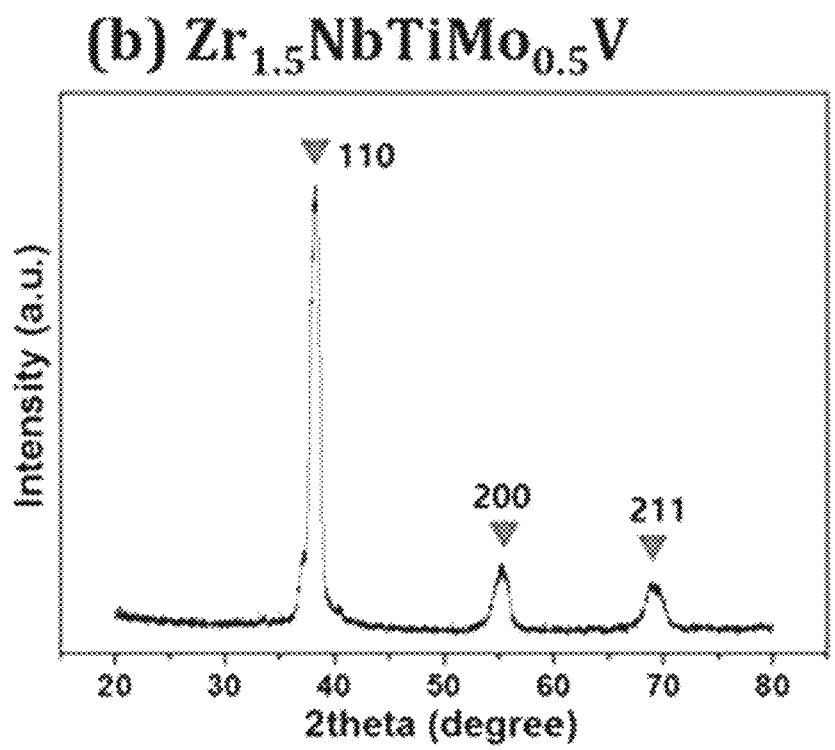
Figure 7C:
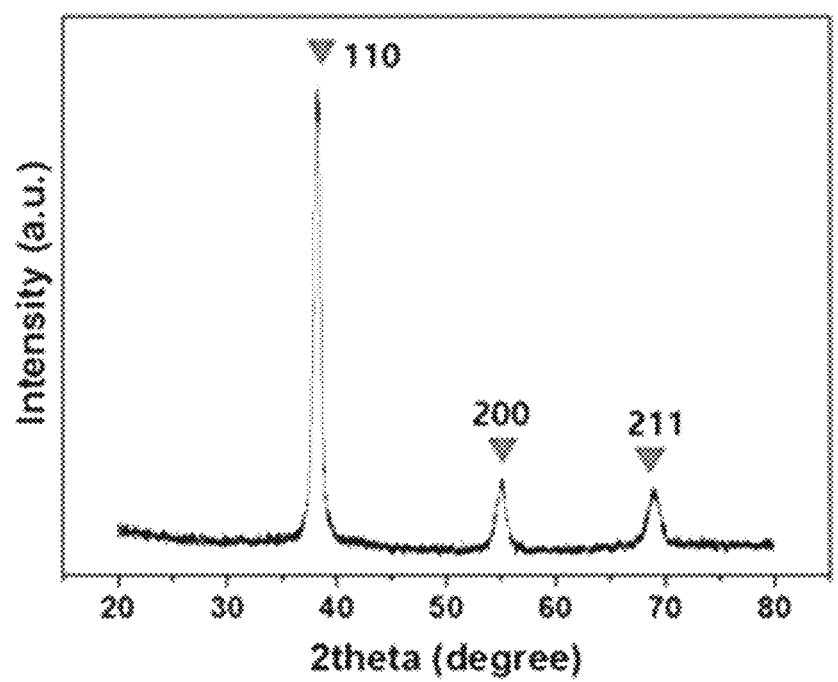
Figure 8A:
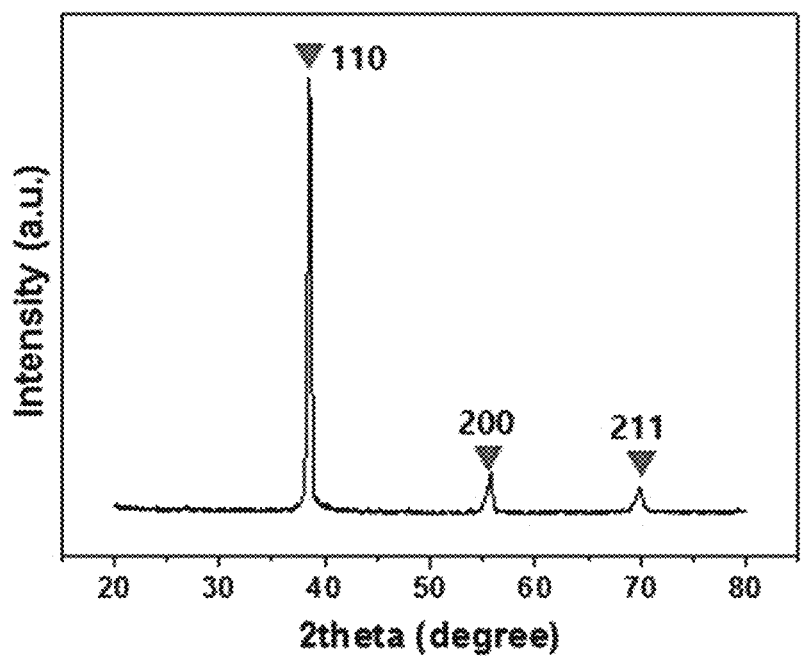
FIGS. 8A to 8D show the results of XRD analysis of (a) $ZrAl_{0.5}NbTiV$, (b) ZrAlNbTiV, (c) $Zr_{0.5}AlNbTiV$, and (d) ZrAlNbTiMo, which are the quinary high-entropy alloy, according to an Example of the present invention.
Figure 8B:
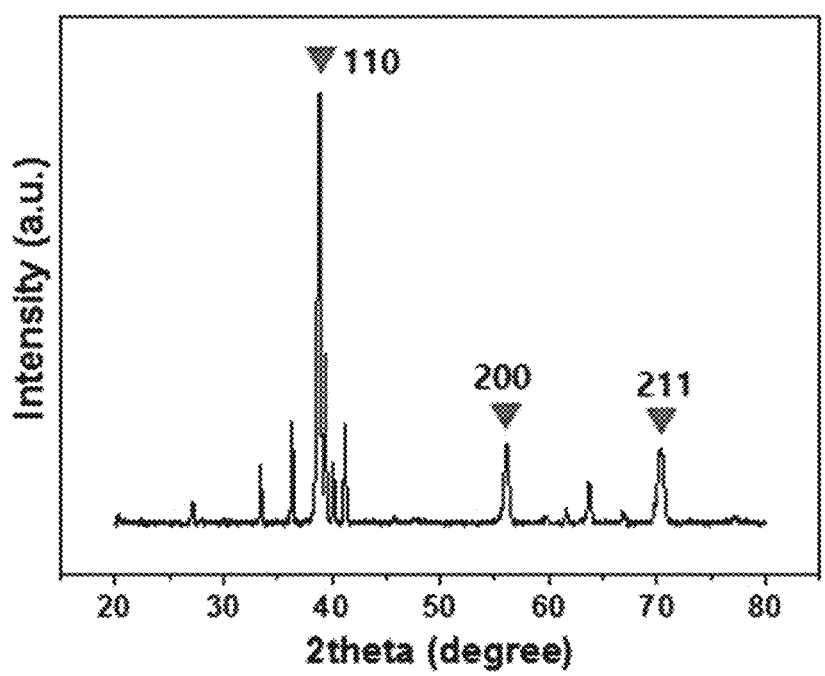
Figure 8C:
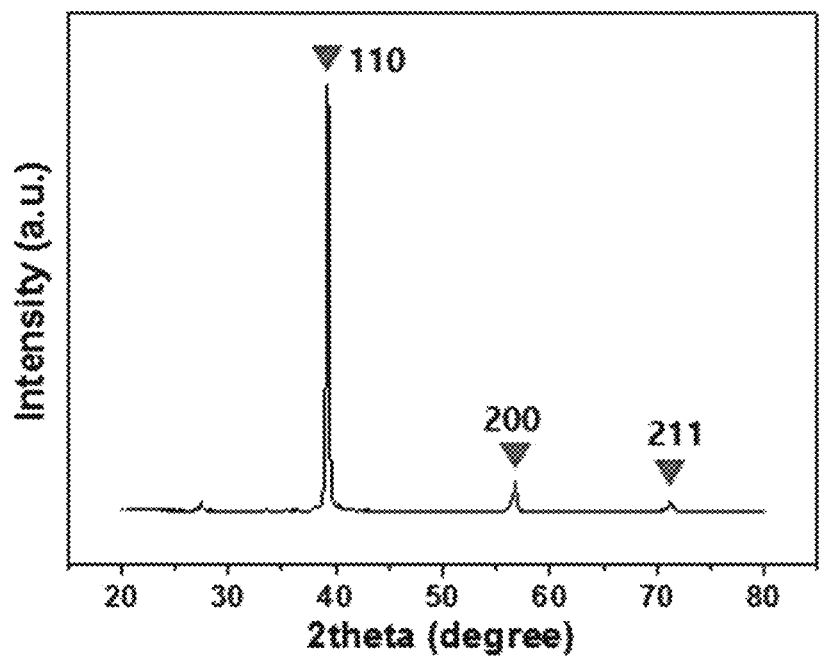
Figure 8D:
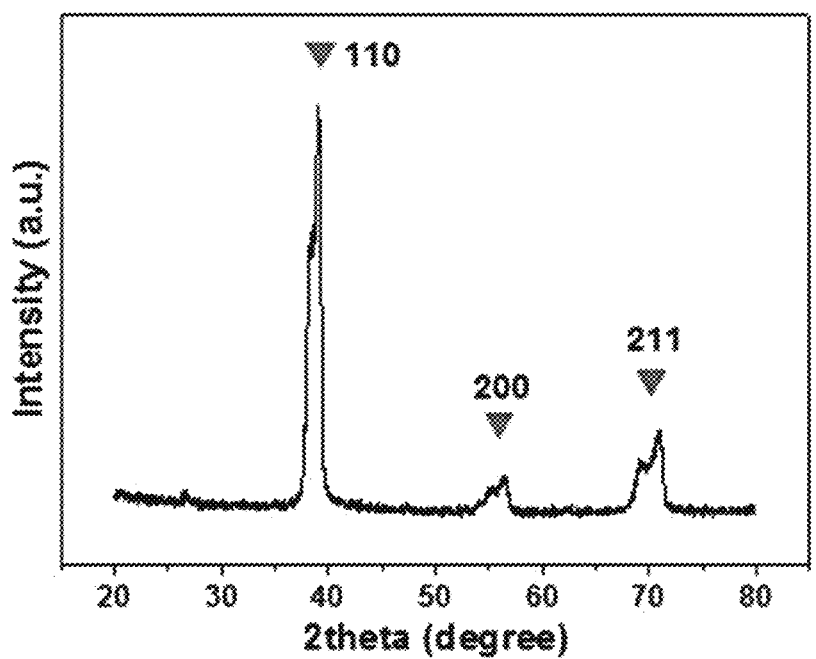
Figure 9A:
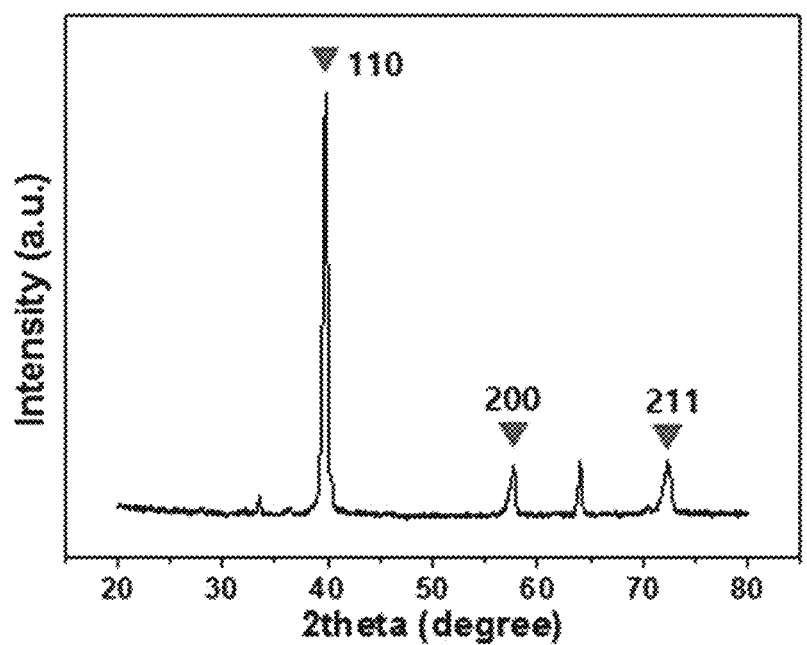
FIGS. 9A to 9D show the results of XRD analysis of (a) $Zr_{0.5}AlNbTiMoV$, (b) ZrAlNbTiMoV, (c) $ZrAl_{0.5}NbTiMoV$, and (d) $ZrAl_{0.5}NbTiMo_{0.5}V$, which are a senary high-entropy alloy, according to an Example of the present invention.
Figure 9B:
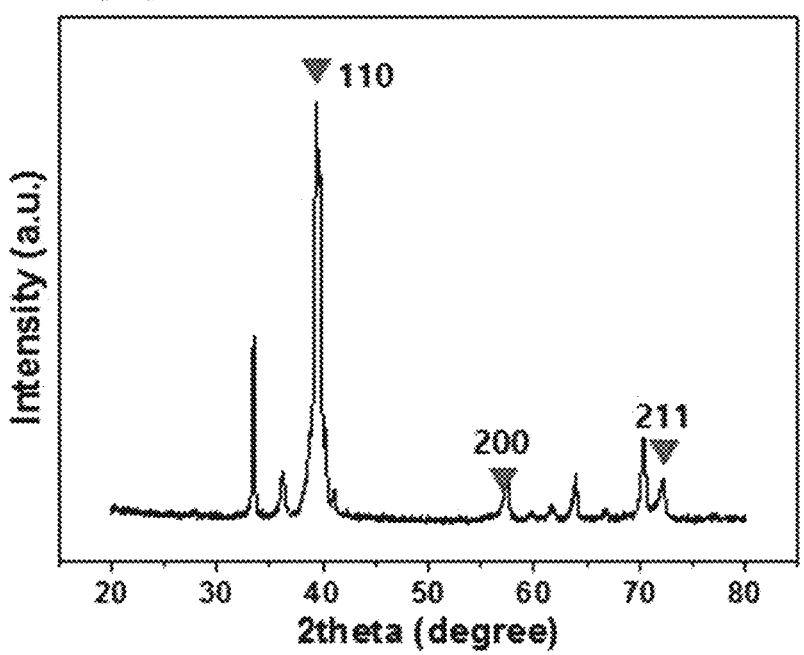
Figure 9C:
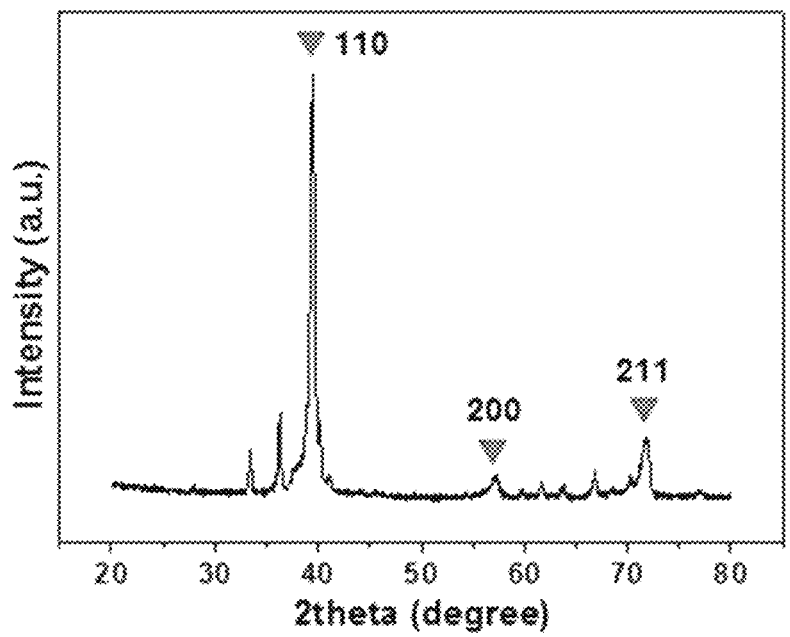
Figure 9D:
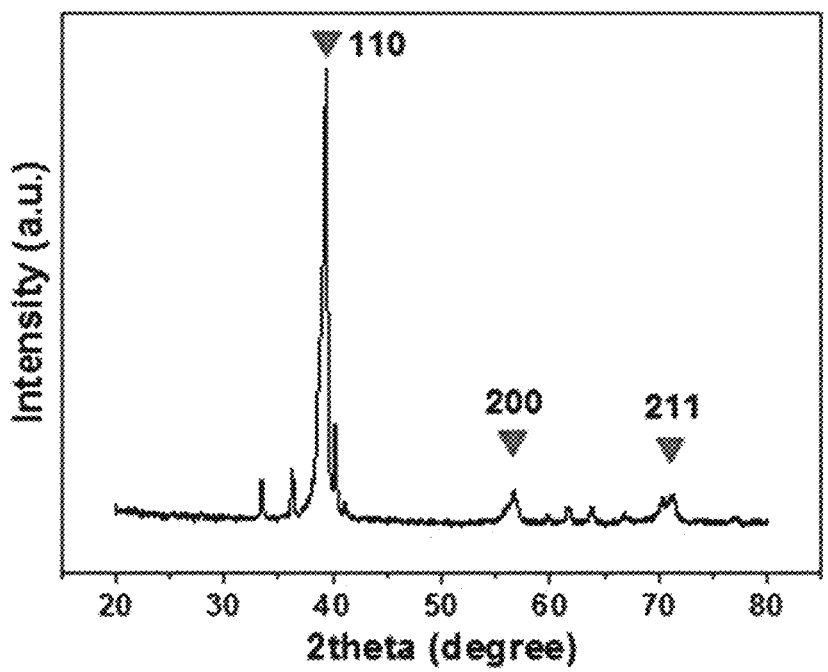

FIGS. 7A to 7C show the results of XRD analysis of (a) $Zr_{1.5}Nb_{1.5}TiMoV$, (b) $Zr_{1.5}NbTiMo_{0.5}V$, and (c) $ZrNbTiMo_{0.33}V_{0.66}$, which are the quinary high-entropy alloy, according to an Example of the present invention. The alloys shown in FIGS. 8A to 8D are designed to be the quinary high-entropy alloy, which includes two or more elements selected from Zr, Al, and Nb, one or more elements selected from Cr and Ti, and one or more elements selected from Mo and V, as in FIGS. 6A to 6D, and two elements of the constitutional components have atomic ratios that are different from those of the three other elements.

From the drawings, it can be confirmed that the high-entropy BCC alloy, which does not include the intermetallic compound, was formed in all compositions. Accordingly, it can be confirmed that the high-entropy BCC-structure solid solution matrix alloy is manufactured even when the composition of the constitutional element is variously changed within the composition range of 5 to 35%.

FIGS. 8A to 8D show the results of XRD analysis of (a) $ZrAl_{0.5}NbTiV$, (b) ZrAlNbTiV, (c) $Zr_{0.5}AlNbTiV$, and (d) ZrAlNbTiMo, which are the quinary high-entropy alloy, according to an Example of the present invention. The alloys shown in FIGS. 8A to 8D are designed to be the quinary high-entropy alloy which includes Zr, Al, and Nb, and also includes one or more elements selected from Cr and Ti or one or more elements selected from Mo and V. From FIGS. 8A to 8D, it can be confirmed that in the alloy system including ZrAlNbTiV, the favorable BCC structure is formed in both cases of (a) $ZrAl_{0.5}NbTiV$ and (c) $Zr_{0.5}AlNbTiV$, which includes any one element at the atomic ratio that is different from those of the remaining elements, but some intermetallic compounds are generated despite the matrix mostly having the BCC structure in the high-entropy state in the case of (b) ZrAlNbTiV, having the equiatomic ratio. For the aforementioned composition group, the amount of the intermetallic compound, which is formed in the solid solution matrix, is changed depending on changes in the relative content of Zr and Al. Accordingly, the ratio of the constitutional element (or the composition of the constitutional element) may be changed to adjust the amount of the intermetallic compound, which is generated in the high-entropy solid solution matrix. Further, in the case of (d) ZrAlNbTiMo alloy, which is obtained by substituting V with Mo in the (b) ZrAlNbTiV alloy, a favorable BCC structure is obtained. Accordingly, it can be seen that the generation of the intermetallic compound and the amount of the intermetallic compound are controlled depending on the type of constitutional element, in addition to the ratio of the constitutional element.

FIGS. 9A to 9D show the results of XRD analysis of (a) $Zr_{0.5}AlNbTiMoV$, (b) ZrAlNbTiMoV, (c) $ZrAl_{0.5}NbTiMoV$, and (d) $ZrAl_{0.5}NbTiMo_{0.5}V$, which are a senary high-entropy alloy, according to an Example of the present invention. The alloys shown in FIGS. 9A to 9D are designed to be a senary high-entropy alloy which includes Zr, Al, and Nb, one or more elements selected from Cr and Ti, and one or more elements selected from Mo and V. From FIGS. 9A to 9D, it can be confirmed that a favorable BCC structure is formed in the case of (a) $Zr_{0.5}AlNbTiMoV$, which includes the Zr element at an atomic ratio that is different from those of the remaining elements, but some intermetallic compounds are generated but the matrix mostly has the BCC structure in the high-entropy state in the case of (b) ZrAlNbTiMoV having the equiatomic ratio, (c) $ZrAl_{0.5}NbTiMoV$, in which only Al is present at a different atomic ratio, and (d) ZrAl$_{0.5}$NbTiMo$_{0.5}$V, in which the atomic ratios of Al and Mo are different from those of the remaining elements. Accordingly, the present invention may be applied to the design of a multicomponent alloy having five or more components, thereby manufacturing a high-entropy BCC-structure solid solution matrix alloy. Further, the amount of the intermetallic compound that is generated in the high-entropy solid solution matrix may be adjusted depending on the type of the constitutional element that is added in an amount that is different from those of the remaining elements, in addition to the atomic ratio of the constitutional elements.

As described above, the entropy-controlled solid solution matrix BCC alloy of the present invention includes an alloy having the entropy-controlled single BCC phase, and additionally includes an alloy that includes a plurality of main elements and the second phase such as the intermetallic compound present in a small amount in the solid solution matrix. Therefore, in the present invention, a $T_{2nd}/T_s$ value is provided as a forming performance prediction factor for determining the fine structural properties. The $T_{2nd}/T_s$ value is obtained by normalizing the precipitation temperature $T_{2nd}$ of the second phase, that is, the intermetallic compound, using a solidification temperature $T_s$.

Additionally, the entropy-controlled solid solution matrix BCC alloy of the present invention is a kind of high-entropy alloy, which has a thermodynamically meta-stable phase because a high-temperature stable phase is maintained at room temperature, and whether or not the high-entropy solid solution matrix BCC alloy is formed cannot be predicted using a known thermodynamic calculation. However, from the alloy development process, it is confirmed that the temperature range at which the high-entropy solid solution matrix BCC phase is stable is wider in the alloy group having the entropy-controlled single BCC phase than in the solid solution matrix BCC alloy that includes a plurality of main elements and the precipitated second phase, such as the intermetallic compound. This is because the diffusion speed of the atom is increased in the alloy to thus easily precipitate the second phase as the precipitation temperature of the second phase approaches the solidification temperature. Based on the aforementioned description, the $T_{2nd}/T_s$ value, which is obtained by normalizing the precipitation temperature $T_{2nd}$ of the second phase using the solidification temperature $T_s$, is developed as an index of the formation condition of the entropy-controlled solid solution matrix BCC alloy. Particularly, according to the result of measurement of the fine structure in the Examples of the present invention, with regard to the formation performance of the single BCC-phase alloy, the single BCC-phase alloy is formed when the $T_{2nd}/T_s$ value, which is measured using thermal analysis instruments or is predicted based on thermodynamic calculations and which is obtained by normalizing the precipitation temperature $T_{2nd}$ of the second phase, such as the intermetallic compound, using the solidification temperature $T_s$, is 0.65 or less.

Figure 10A:
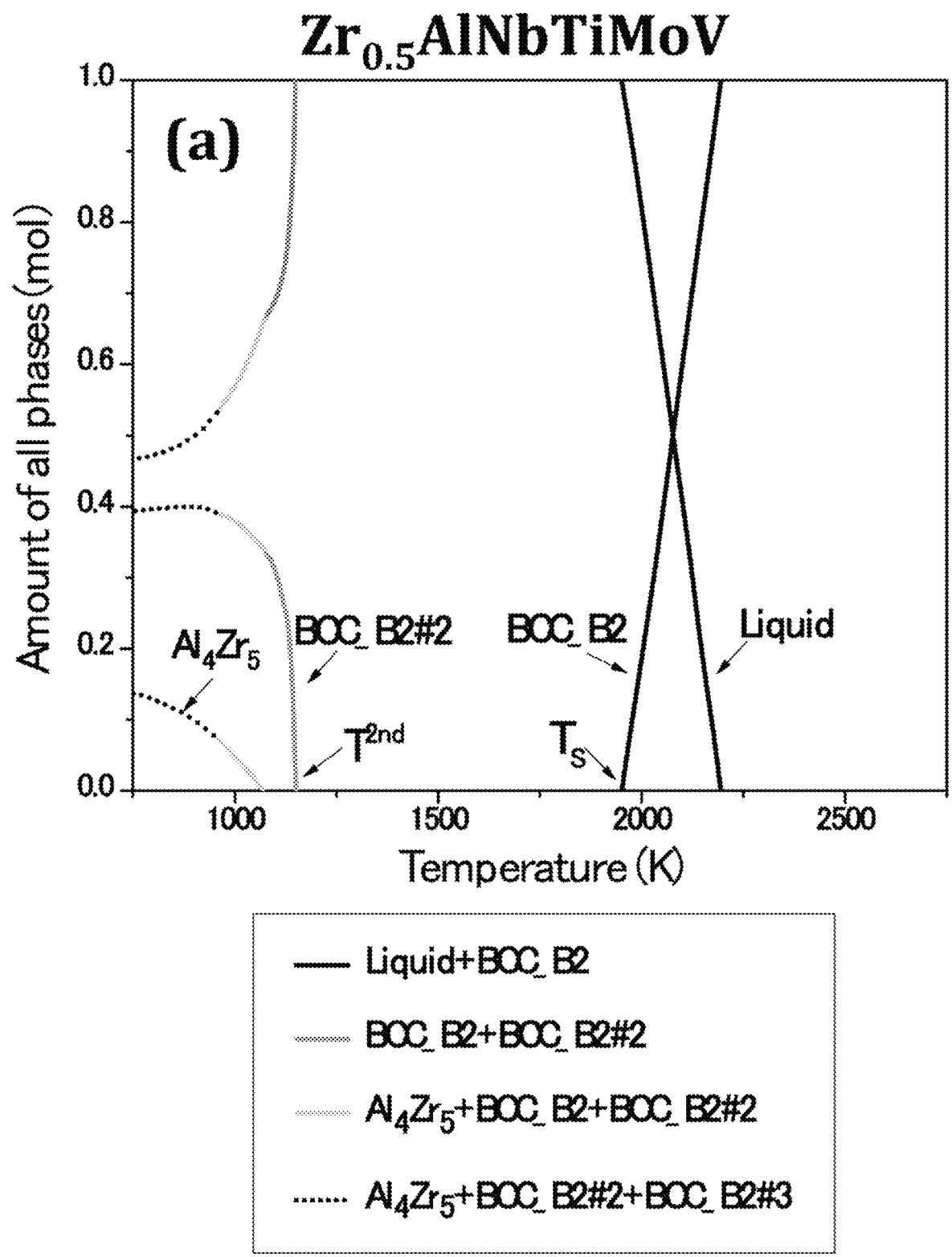
FIGS. 10A and 10B show that $T_{2nd}$ and $T_s$ of (a) $Zr_{0.5}AlNbTiMoV$ and (b) ZrAlNbTiMoV, which are the senary high-entropy alloy of the present invention, are predicted using thermodynamic calculation (CALPHAD)
Figure 10B:
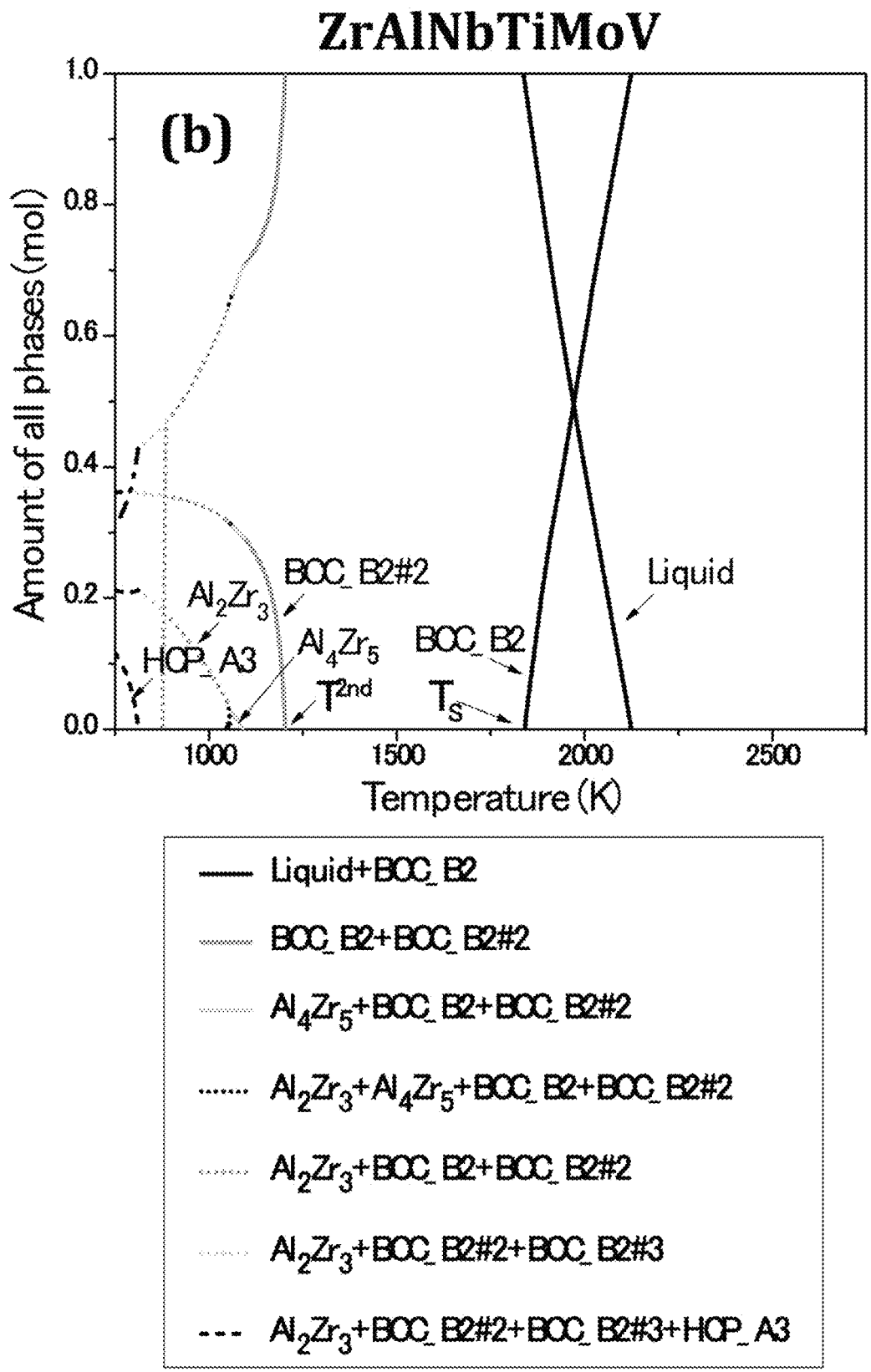
Figure 11A:
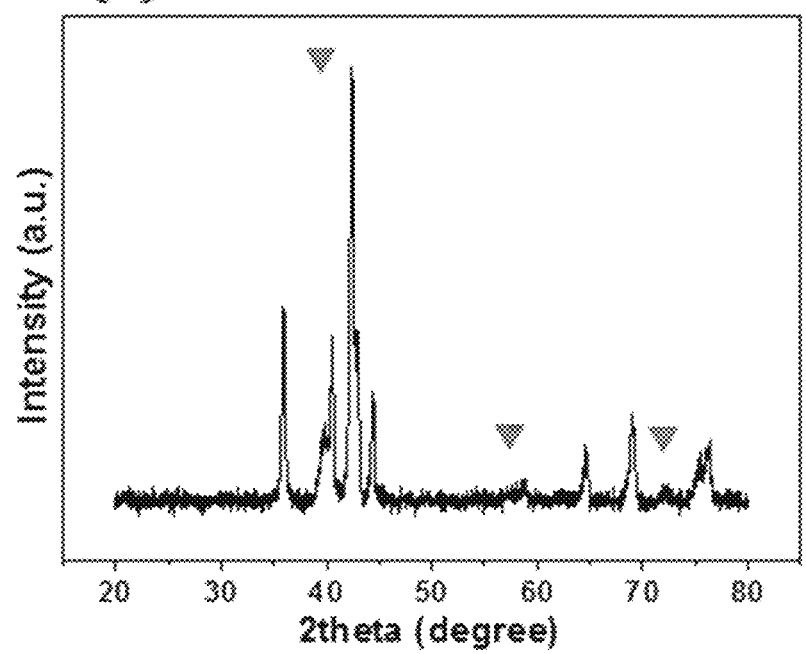
FIGS. 11A to 11D show the results of XRD analysis of (a) NbCrTiVCu, (b) ZrNbCrTiCu, (c) ZrNbTiFe, and (d) ZrAlNbTiF, which are alloys including elements (Cu and Fe) other than the constitutional elements of the present invention, as Comparative Examples of the present invention.
Figure 11B:
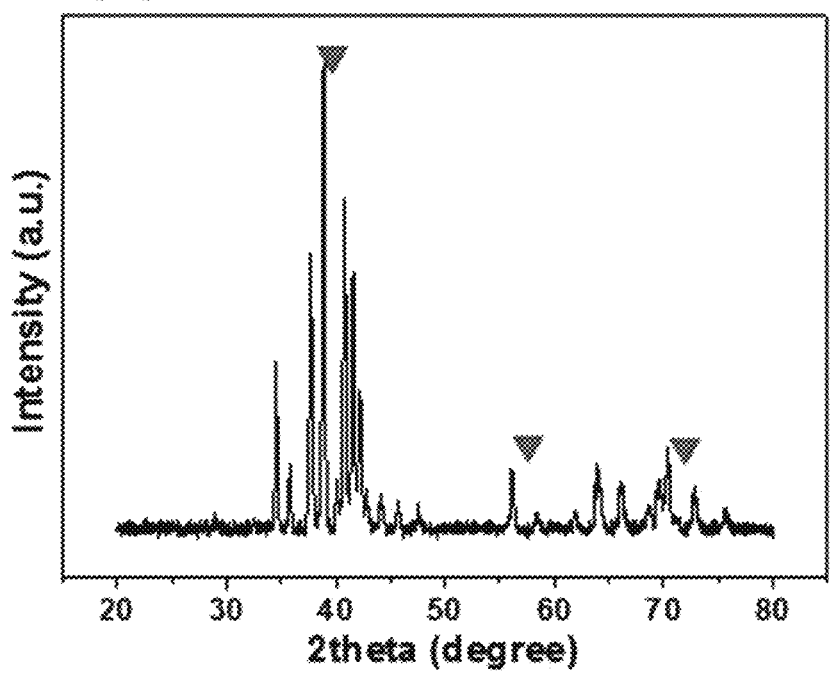
Figure 11C:
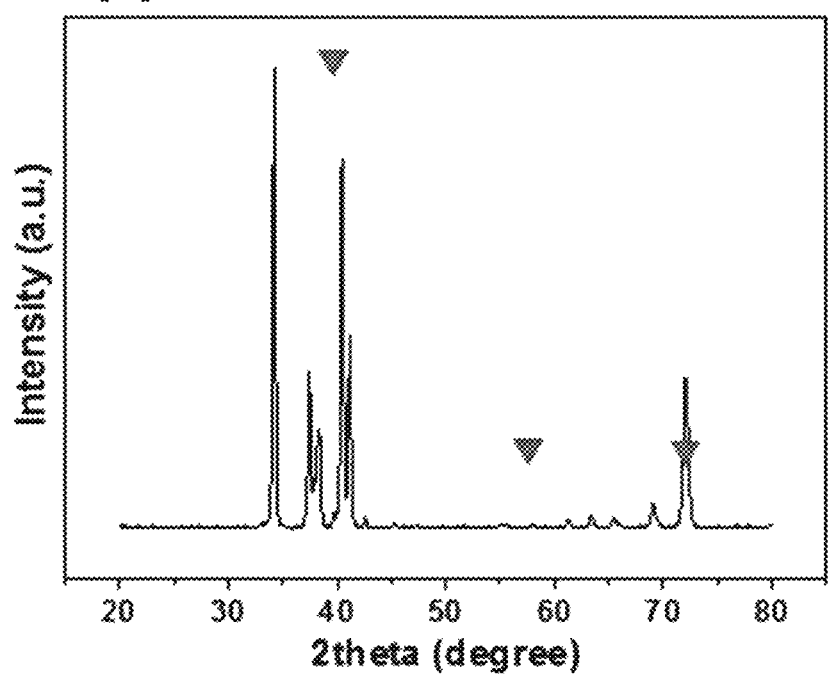
Figure 11D:
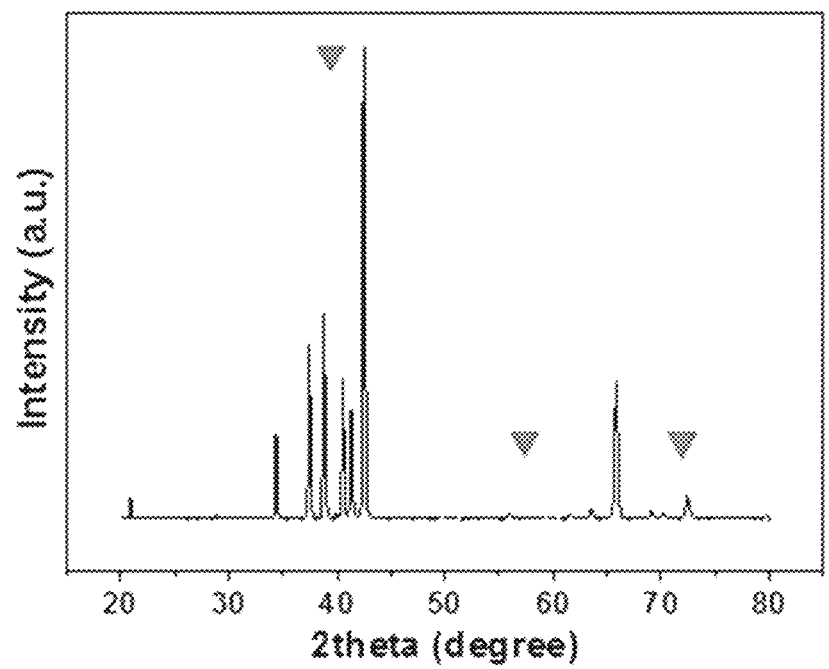

FIGS. 10A and 10B show predictions of phase ratios of (a) Zr$_{0.5}$AlNbTiMoV and (b) ZrAlNbTiMoV, which are the senary high-entropy alloy of the present invention, based on temperature using thermodynamic calculation (CAL-PHAD). As shown in FIGS. 10A and 10B, the (b) ZrAlNbMoVTi alloy is a senary alloy, but the interval between $T_{2nd}$ and $T_s$ is relatively small, and accordingly, the $T_{2nd}/T_s$ value is more than 0.65 when measured. FIGS. 9A to 9D show the BCC+IC, in which some intermetallic compounds are precipitated in the solid solution BCC matrix that includes a plurality of main elements. On the other hand, in the (a) Zr$_{0.5}$AlNbMoVTi alloy having the adjusted Zr composition, the interval between $T_{2nd}$ and $T_s$ is relatively large, and accordingly, the $T_{2nd}/T_s$ value is less than 0.55. From the XRD analysis, it can be confirmed that a single BCC phase solid solution is formed.

FIGS. 11A to 11D show the results of XRD analysis of (a) NbCrTiVCu, (b) ZrNbCrTiCu, (c) ZrNbTiFe, and (d) ZrAlNbTiF, which are alloys including Cu and Fe as elements other than the constitutional elements of the present invention, as Comparative Examples of the present invention.

In FIGS. 11A to 11D, (a) NbCrTiVCu and (b) ZrNbCrTiCu are constituted by a five-component system which includes four elements, including one or more elements selected from Zr, Al, and Nb, one or more elements selected from Cr and Ti, and one or more elements selected from Mo and V as in the present invention, and further includes Cu as the remaining element, unlike the present invention. From FIGS. 11A to 11D, it can be confirmed that the BCC phase, which is represented by the inverted triangle, is present in a small amount, but the intermetallic compound phase is precipitated in a large amount.

Similarly, (c) ZrNbTiFe and (d) ZrAlNbTiFe of FIGS. 11A to 11D are constituted by a five-component system which includes four elements including two or more elements selected from Zr, Al, and Nb, and one or more elements selected from Cr and Ti or one or more elements selected from Mo and V, and further includes a balance of Fe other than the constitutional elements of the present invention. From FIGS. 11A to 11D, it can be confirmed that the BCC structure, which is represented by the inverted triangle, is not precipitated, but the intermetallic compound and unconfirmed phases are precipitated.

Four or five components are mixed at the equiatomic ratio to manufacture the alloy in the Comparative Examples, which are shown in FIGS. 11A to 11D, as in the present invention. However, it can be confirmed that the intermetallic compound is formed in a large amount due to the presence of Fe and Cu, other than the constitutional elements included in the present invention, and accordingly, the BCC-structure solid solution matrix state is not ensured.

Accordingly, even though the multicomponent system includes four or more constitutional elements having large atomic ratios that are similar to each other, the stable BCC-structure solid solution matrix alloy is not formed in all types of multicomponent systems, but is formed based on the basic premise that the mixing enthalpy difference is small ($\Delta H_{mix}=\pm 15$ kJ/mol or less).

Therefore, it can be confirmed that the ternary to senary alloys of the present invention have the stable single-phase BCC structure.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:
1. A solid solution matrix BCC alloy consisting of:
    five elements selected from an element group consisting of Zr, Al, Nb, Mo, V, and Ti, selected based on a neutron absorption cross-sectional area and a mixing enthalpy,
    wherein four elements of the five elements are Zr, Al, Nb and Ti in the element group,
    wherein one element of the five elements is Mo or V in the element group, and wherein each of the five elements is included at an equiatomic ratio within an error tolerance limit of 10 at % and the solid solution matrix BCC alloy is a BCC-structure solid solution matrix alloy, which includes multicomponent main elements.

2. The solid solution matrix BCC alloy of claim 1, wherein the one element is Mo in the element group.

3. A fast-breeder reactor comprising:
the solid solution matrix BCC alloy of claim 1 as a material for a portion on which neutrons are radiated at a temperature.

4. A method of manufacturing the solid solution matrix BCC alloy of claim 1, the method comprising:
an arc-melting step of arc-melting raw materials and then cooling the molten raw materials, or a sintering step of manufacturing the raw materials in a powder form and then sintering the raw materials using spark plasma sintering or hot isostatic pressing at a temperature and a pressure.

5. The method of claim 4, wherein a $T_{2nd}/T_s$ value, which is obtained by normalizing a precipitation temperature $T_{2nd}$ of a second phase competing with a solid solution using a solidification temperature $T_s$, is used to evaluate whether or not the solid solution matrix BCC alloy is formed during preparation of the raw materials.

6. The method of claim 5, wherein whether a single BCC-phase alloy is formed or not is evaluated based on the $T_{2nd}/T_s$ value of 0.65 or less.

* * * * *